United States Patent
Koizumi et al.

(10) Patent No.: US 12,422,002 B2
(45) Date of Patent: Sep. 23, 2025

(54) DAMPER DEVICE

(71) Applicant: EXEDY Corporation, Neyagawa (JP)

(72) Inventors: Hiroto Koizumi, Neyagawa (JP);
Hiroshi Uehara, Neyagawa (JP)

(73) Assignee: EXEDY Corporation, Neyagawa (JP)

( * ) Notice: Subject to any disclaimer, the term of this patent is extended or adjusted under 35 U.S.C. 154(b) by 440 days.

(21) Appl. No.: 18/091,595

(22) Filed: Dec. 30, 2022

(65) Prior Publication Data

US 2023/0243388 A1 Aug. 3, 2023

(30) Foreign Application Priority Data

Feb. 1, 2022 (JP) ................. 2022-014057

(51) Int. Cl.
*F16D 7/02* (2006.01)
*F16F 15/129* (2006.01)
*F16F 15/139* (2006.01)

(52) U.S. Cl.
CPC .......... *F16D 7/025* (2013.01); *F16F 15/1297* (2013.01); *F16F 15/1397* (2013.01)

(58) Field of Classification Search
CPC .... F16D 7/025; F16F 15/1297; F16F 15/1397
USPC .................................. 464/46, 68.1
See application file for complete search history.

(56) References Cited

U.S. PATENT DOCUMENTS

| | | | |
|---|---|---|---|
| 8,858,345 B2 * | 10/2014 | Sugiyama | F16D 7/025 464/46 |
| 8,968,150 B2 * | 3/2015 | Misu | B60L 50/16 |
| 10,948,024 B1 * | 3/2021 | Uehara | F16F 15/1297 |

FOREIGN PATENT DOCUMENTS

JP 2011-226572 A 11/2011

* cited by examiner

*Primary Examiner* — Greg Binda
(74) *Attorney, Agent, or Firm* — United IP Counselors, LLC

(57) ABSTRACT

A damper device includes a damper unit and a torque limiter unit. The damper unit includes a first input plate, a second input plate, a fastening portion fastening the first and second input plates, an output plate, and an elastic member elastically connecting the output plate and the first and second input plates. The torque limiter unit includes a first side plate, a second side plate, a friction plate, and a first friction material disposed between the friction plate and the first side plate. The first input plate includes an outer peripheral end disposed on a first side of an inner peripheral end of the first side plate in an axial direction. The first input plate has an outer diameter greater than an inner diameter of the first side plate. The fastening portion is disposed on the first side of the first side plate in the axial direction.

7 Claims, 5 Drawing Sheets

SECOND SIDE ⟵⟶ FIRST SIDE

DAMPER DEVICE

CROSS-REFERENCE TO RELATED APPLICATIONS

This application claims priority to Japanese Patent Application No. 2022-014057 filed Feb. 1, 2022. The entire contents of that application are incorporated by reference herein in their entirety.

TECHNICAL FIELD

The present invention relates to a damper device.

BACKGROUND ART

A type of hybrid vehicle including an engine and an electric motor, for instance, uses such a damper device having a torque limiter function as described in Japan Laid-open Patent Application Publication No. 2011-226572 in order to prevent transmission of an excessive torque from an output side to an engine side in engine start and so forth.

The damper device described in Japan Laid-open Patent Application Publication No. 2011-226572 includes a damper unit and a torque limiter unit disposed radially outside the damper unit. The torque limiter unit includes a friction disc provided with friction materials fixed to both surfaces thereof. Besides, in the torque limiter unit, the friction disc is interposed between and held by a cover plate and a pressure plate. When an excessive torque greater than a predetermined value is inputted to the torque limiter unit, sliding is configured to occur between the friction disc and both the cover plate and the pressure plate so as not to transmit the excessive torque therefrom.

Chances are that rusty water is produced due to attachment of water to respective members composing the damper unit in the damper device configured as described above. When the rusty water is transferred to the friction materials, the friction disc and both the cover plate and the pressure plate are fixed firmly. This can result in a drawback that the torque limiter unit is not actuated as designed.

It is an object of the present invention to provide a damper device in which rusty water can be inhibited from being transferred to a friction material.

BRIEF SUMMARY

A damper device according to an aspect of the present invention is configured to be attached to a power source-side member on a first side of the power source-side member in an axial direction. The damper device includes a damper unit and a torque limiter unit. The torque limiter unit is configured to be attached to the power source-side member. The damper unit includes a first input plate, a second input plate, a fastening portion, an output plate, and an elastic member. The second input plate is disposed on a second side of the first input plate in the axial direction. The second input plate is configured to rotate unitarily with the first input plate. The fastening portion fastens the first and second input plates. The elastic member elastically connects the output plate and the first and second input plates. The torque limiter unit includes a first side plate having an annular shape, a second side plate having an annular shape, a friction plate, and a first friction material. The second side plate is disposed on the second side of the first side plate in the axial direction. The second side plate is disposed apart from the first side plate at an interval in the axial direction. The friction plate is configured to rotate unitarily with the first and second input plates. The first friction material is disposed between the friction plate and the first side plate. The first input plate includes an outer peripheral end disposed on the first side of an inner peripheral end of the first side plate in the axial direction. The first input plate has an outer diameter greater than an inner diameter of the first side plate. The fastening portion is disposed on the first side of the first side plate in the axial direction.

Rusty water is likely to be produced by water attached to the damper device on the opposite side of the power source-side member, i.e., the first side in the axial direction. In other words, rusty water is likely to be produced on a first side surface (a surface facing the first side in the axial direction) of the first input plate. In view of this, the damper device according to the present invention is configured as follows. The outer peripheral end of the first input plate is disposed on the first side of the inner peripheral end of the first side plate in the axial direction; besides, the outer diameter of the first input plate is greater than the inner diameter of the first side plate. Because of this, the rusty water produced on the first side surface of the first input plate is not transferred to a space produced between the first and second side plates. As a result, the rusty water can be inhibited from being transferred to the first friction material.

Preferably, the fastening portion is disposed to overlap with the first side plate as seen in the axial direction.

Preferably, the output plate is disposed on the first side of the first side plate in the axial direction.

Preferably, the friction plate is disposed on the second side of the second input plate in the axial direction.

Preferably, the first input plate includes a first plate body and a first attachment portion. The first attachment portion protrudes radially outward from the first plate body. The fastening portion fastens the first attachment portion and the second input plate.

Preferably, the second input plate includes a second plate body, an extending portion, and a second attachment portion. The extending portion extends from the second plate body to the first side in the axial direction. The second attachment portion extends radially outward from the extending portion. The fastening portion fastens the first attachment portion and the second attachment portion.

Overall, according to the present invention, rusty water can be inhibited from being transferred to a friction material.

DETAILED DESCRIPTION

[Entire Configuration]

Figure 1:
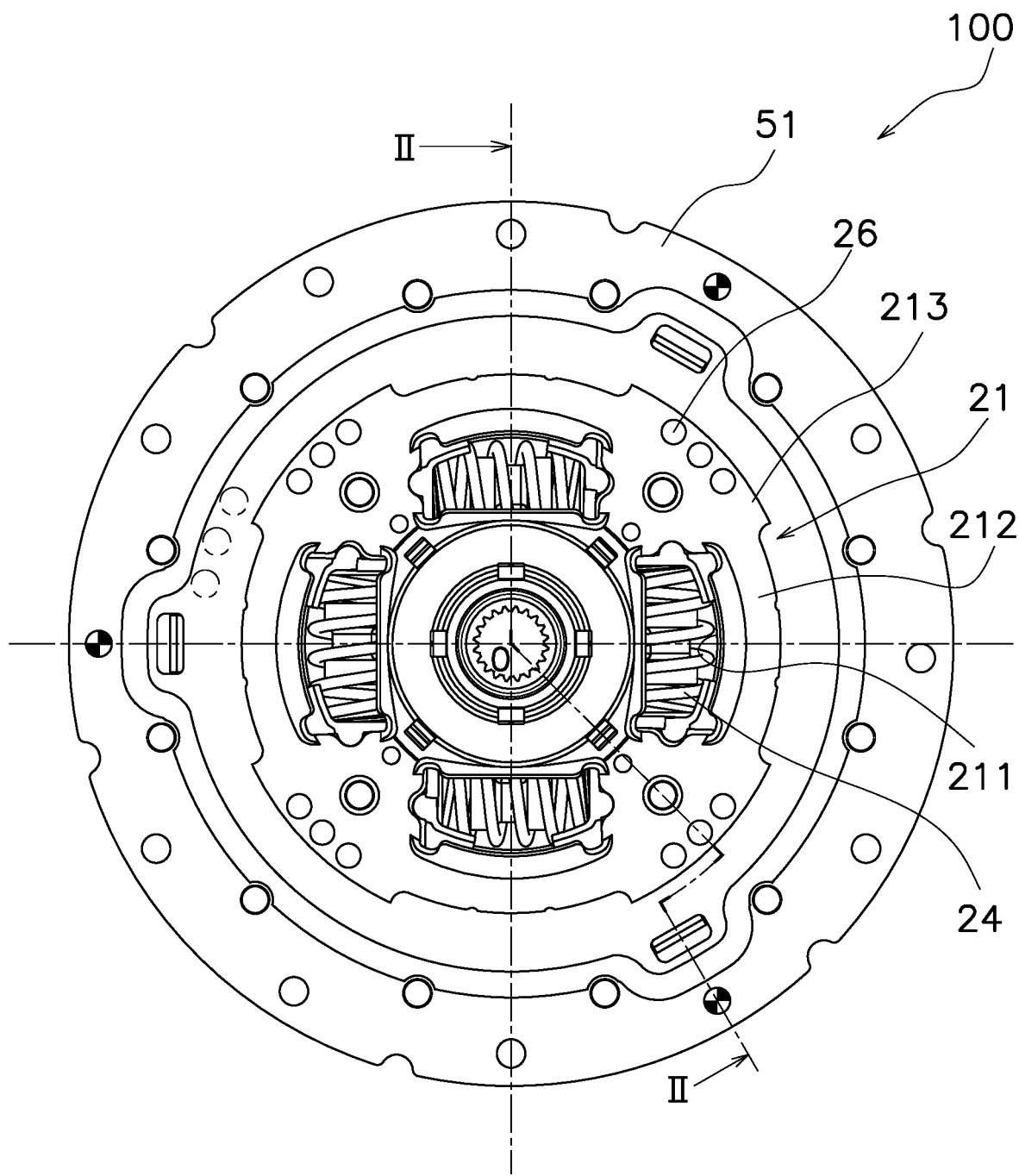
FIG. 1 is a front view of a damper device.
Figure 2:
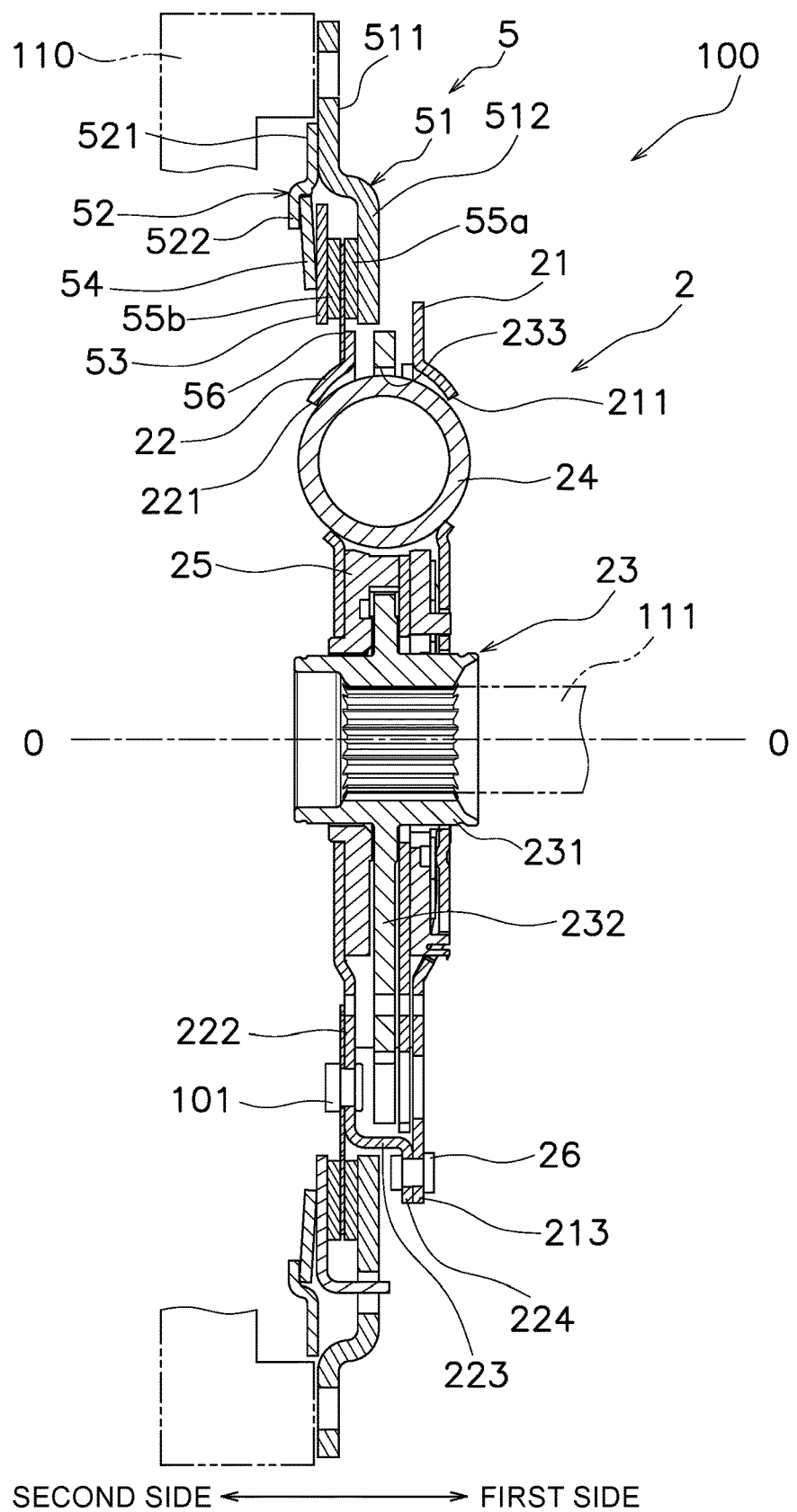
FIG. 2 is a cross-sectional view of FIG. 1 taken along line II-II.

FIG. 1 is a front view of a damper device 100 according to a present preferred embodiment, whereas FIG. 2 is a cross-sectional view of FIG. 1 taken along line II-II. In FIG. 2, line O-O indicates a rotational axis of the damper device 100. In FIG. 2, an engine (exemplary power source) is disposed on the left side of the damper device 100, whereas a drive unit, including an electric motor, a transmission, and so forth, is disposed on the right side of the damper device 100.

It should be noted that in the following explanation, the term "axial direction" refers to an extending direction of the rotational axis O of the damper device 100. Besides, the term "first side in the axial direction" means the right side in FIG. 2, whereas the term "second side in the axial direction" means the left side in FIG. 2. In other words, the term "first side in the axial direction" means an output side, whereas the term "second side in the axial direction" means an input side. On the other hand, the term "circumferential direction" refers to a circumferential direction of an imaginary circle about the rotational axis O, whereas the term "radial direction" refers to a radial direction of the imaginary circle about the rotational axis O. It should be noted that the circumferential direction is not required to be perfectly matched with the circumferential direction of the imaginary circle about the rotational axis O; likewise, the radial direction is not required to be perfectly matched with a diameter direction of the imaginary circle about the rotational axis O.

As shown in FIGS. 1 and 2, the damper device 100 is provided between a flywheel 110 (exemplary power source-side member) and an input shaft 111 of the drive unit. The damper device 100 is disposed on the first side of the flywheel 110 in the axial direction. The damper device 100 is attached to the flywheel 110. In other words, the surface of the damper device 100, disposed on the second side in the axial direction, is covered with the flywheel 110. Besides, the damper device 100 is configured to limit a torque transmitted between the engine and the drive unit, and simultaneously, attenuate rotational fluctuations. The damper device 100 includes a damper unit 2 and a torque limiter unit 5.

[Torque Limiter Unit 5]

The torque limiter unit 5 is configured to be attached to the flywheel 110. The torque limiter unit 5 is disposed radially outside the damper unit 2. The torque limiter unit 5 is configured to limit the torque transmitted between the flywheel 110 and the damper unit 2.

The torque limiter unit 5 includes a first side plate 51, a second side plate 52, a pressure plate 53, a cone spring 54, a first friction material 55a, a second friction material 55b, and a friction plate 56.

<First Side Plate 51>

The first side plate 51 has an annular shape. The first side plate 51 is attached to the flywheel 110. In other words, the first side plate 51 receives the torque transmitted thereto from the flywheel 110. The first side plate 51 includes an outer peripheral portion 511 and an inner peripheral portion 512.

The outer peripheral portion 511 is attached to the flywheel 110. The inner peripheral portion 512 is disposed on the first side of the outer peripheral portion 511 in the axial direction. The first side plate 51 receives an urging force applied by the cone spring 54 at the inner peripheral portion 512 thereof <Second Side Plate 52>

The second side plate 52 has an annular shape. The second side plate 52 is disposed on the second side of the first side plate 51 in the axial direction. The second side plate 52 is fixed to the first side plate 51 by rivets (not shown in the drawings) and/or so forth. Because of this, the second side plate 52 is unitarily rotated with the first side plate 51.

The second side plate 52 is disposed apart from the first side plate 51 at an interval in the axial direction. When described in detail, the second side plate 52 includes an outer peripheral portion 521 and an inner peripheral portion 522. Besides, the inner peripheral portion 522 of the second side plate 52 is disposed apart from the inner peripheral portion 512 of the first side plate 51 at the interval in the axial direction. It should be noted that the outer peripheral portion 521 of the second side plate 52 is in contact with the outer peripheral portion 511 of the first side plate 51.

The second side plate 52 has a lesser outer diameter than the first side plate 51. It should be noted that the outer diameter of the second side plate 52 can be equal to or greater than that of the first side plate 51. The second side plate 52 has a greater inner diameter than the first side plate 51. The second side plate 52 has a lesser plate thickness than the first side plate 51.

<Friction Plate 56>

The friction plate 56 has an annular shape. The friction plate 56 is configured to be unitarily rotated with both a first input plate 21 and a second input plate 22. When described in detail, the friction plate 56 is attached to the outer peripheral end of the second input plate 22 by rivets 101 and/or so forth. The friction plate 56 is disposed on the second side of the second input plate 22 in the axial direction. The friction plate 56 has a lesser thickness than the second input plate 22. The friction plate 56 is disposed axially between the first side plate 51 and the second side plate 52.

<Friction Materials 55a and 55b>

Each of the first and second friction materials 55a and 55b has an annular shape. The first friction material 55a is disposed axially between the friction plate 56 and the first side plate 51. The second friction material 55b is disposed axially between the friction plate 56 and the second side plate 52. When described in detail, the second friction material 55b is disposed axially between the friction plate 56 and the pressure plate 53.

The first and second friction materials 55a and 55b are attached to the friction plate 56. The first friction material 55a is engaged by friction with the first side plate 51. On the other hand, the second friction material 55b is engaged by friction with the pressure plate 53. When a torque having a predetermined value or greater is inputted, the first friction material 55a is slid against the first side plate 51, while the second friction material 55b is slid against the pressure plate 53. As a result, the first side plate 51 and the friction plate 56 are rotated relative to each other. It should be noted that the first friction material 55a can be engaged by friction with the friction plate 56, while being fixed to the first side plate 51. On the other hand, the second friction material 55b can be engaged by friction with the friction plate 56, while being fixed to the pressure plate 53.

<Pressure Plate 53>

The pressure plate 53 has an annular shape. The pressure plate 53 is disposed axially between the first and second side plates 51 and 52. When described in detail, the pressure plate 53 is disposed axially between the second friction material 55b and the cone spring 54.

<Cone Spring 54>

The cone spring 54 is disposed axially between the second side plate 52 and the pressure plate 53. The cone spring 54 urges the pressure plate 53 to the first side in the axial direction. Accordingly, the friction plate 56 and both the first and second friction materials 55a and 55b are interposed between and held by the pressure plate 53 and the first side plate 51.

[Damper Unit 2]

The damper unit 2 includes the first input plate 21, the second input plate 22, a hub flange 23, a plurality of elastic members 24, and a plurality of fastening portions 26. Besides, the damper unit 2 includes a hysteresis generating mechanism 25. The damper unit 2 is configured to attenuate rotational fluctuations.

<First and Second Input Plates 21 and 22>

Each of the first and second input plates 21 and 22 is an annular member having a center hole. The first input plate 21 has a greater outer diameter than the second input plate 22.

The first and second input plates 21 and 22 are disposed apart from each other at an interval in the axial direction. The second input plate 22 is disposed on the second side of the first input plate 21 in the axial direction. The first and second input plates 21 and 22 are unitarily rotated with each other. Besides, the first and second input plates 21 and 22 are immovable relative to each other in the axial direction.

The first input plate 21 includes a plurality of first window portions 211. It should be noted that in the present preferred embodiment, the first input plate 21 includes four first window portions 211. The first window portions 211 are aligned apart from each other at intervals in the circumferential direction.

The second input plate 22 includes a plurality of second window portions 221. It should be noted that in the present preferred embodiment, the second input plate 22 includes four second window portions 221. The second window portions 221 are aligned apart from each other at intervals in the circumferential direction. As seen in the axial direction, the second window portions 221 are disposed to overlap with the first window portions 211, respectively.

The first input plate 21 includes a first plate body 212 and a plurality of first attachment portions 213. It should be noted that in the present preferred embodiment, the first input plate 21 includes four first attachment portions 213.

The first plate body 212 has an annular shape. The first attachment portions 213 protrude radially outward from the outer peripheral surface of the first plate body 212. The first attachment portions 213 are disposed apart from each other at intervals in the circumferential direction.

The outer peripheral end of the first input plate 21 is disposed on the first side of the inner peripheral end of the first side plate 51 in the axial direction. As seen in the axial direction, the outer peripheral end of the first input plate 21 overlaps with the inner peripheral end of the first side plate 51. It should be noted that the outer peripheral end of the first input plate 21 means that of the first plate body 212.

The outer diameter of the first input plate 21 is greater than the inner diameter of the first side plate 51. Because of this, the inner peripheral edge of the first side plate 51 is covered with the first input plate 21 and is therefore invisible as seen from the first side in the axial direction. It should be noted that the outer diameter of the first input plate 21 means that of the first plate body 212.

Figure 3:
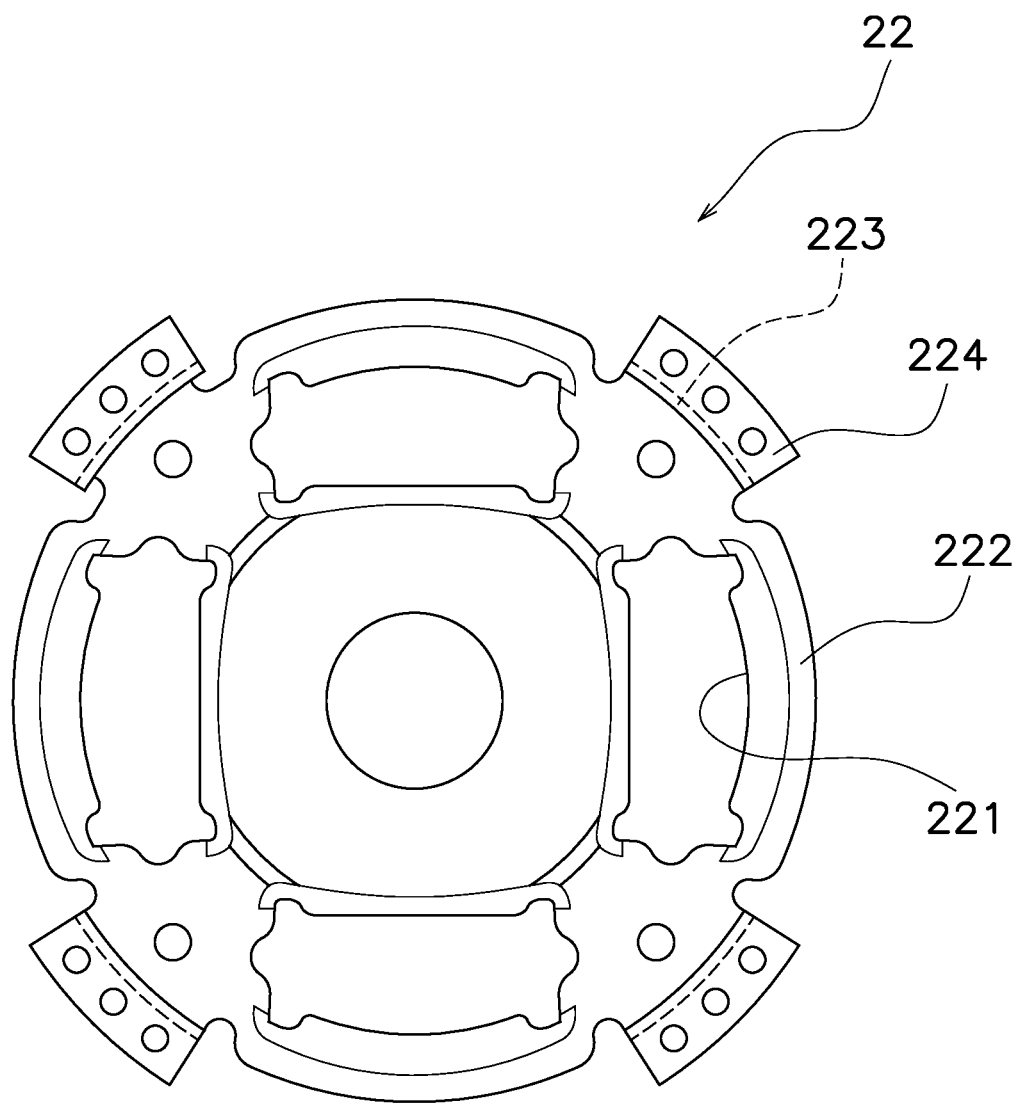
FIG. 3 is a front view of a second input plate.

As shown in FIGS. 2 and 3, the second input plate 22 includes a second plate body 222, a plurality of extending portions 223, and a plurality of second attachment portions 224. It should be noted that in the present preferred embodiment, the second input plate 22 includes four extending portions 223 and four second attachment portions 224.

The second plate body 222 has an annular shape. The extending portions 223 extend from the outer peripheral part of the second plate body 222 to the first side in the axial direction. The extending portions 223 are disposed apart from each other at intervals in the circumferential direction.

The second attachment portions 224 extend radially outward from the extending portions 223. When described in detail, the second attachment portions 224 extend radially outward from the axially first side-ends of the extending portions 223. The second attachment portions 224 are disposed apart from each other at intervals in the circumferential direction.

The outer diameter of the second input plate 22 is lesser than the inner diameter of the first side plate 51. Besides, the outer diameter of the second input plate 22 is lesser than that of the first input plate 21. It should be noted that the outer diameter of the second input plate 22 means that of the second plate body 222.

<Fastening Portions 26>

The fastening portions 26 fasten the first and second input plates 21 and 22 to each other. When described in detail, the fastening portions 26 fasten the first attachment portions 213 of the first input plate 21 and the second attachment portions 224 of the second input plate 22 to each other. The fastening portions 26 are, for instance, rivets.

The fastening portions 26 are disposed on the first side of the first side plate 51 in the axial direction. Besides, the fastening portions 26 are disposed to overlap with the first side plate 51 as seen in the axial direction.

<Hub Flange 23>

Figure 4:
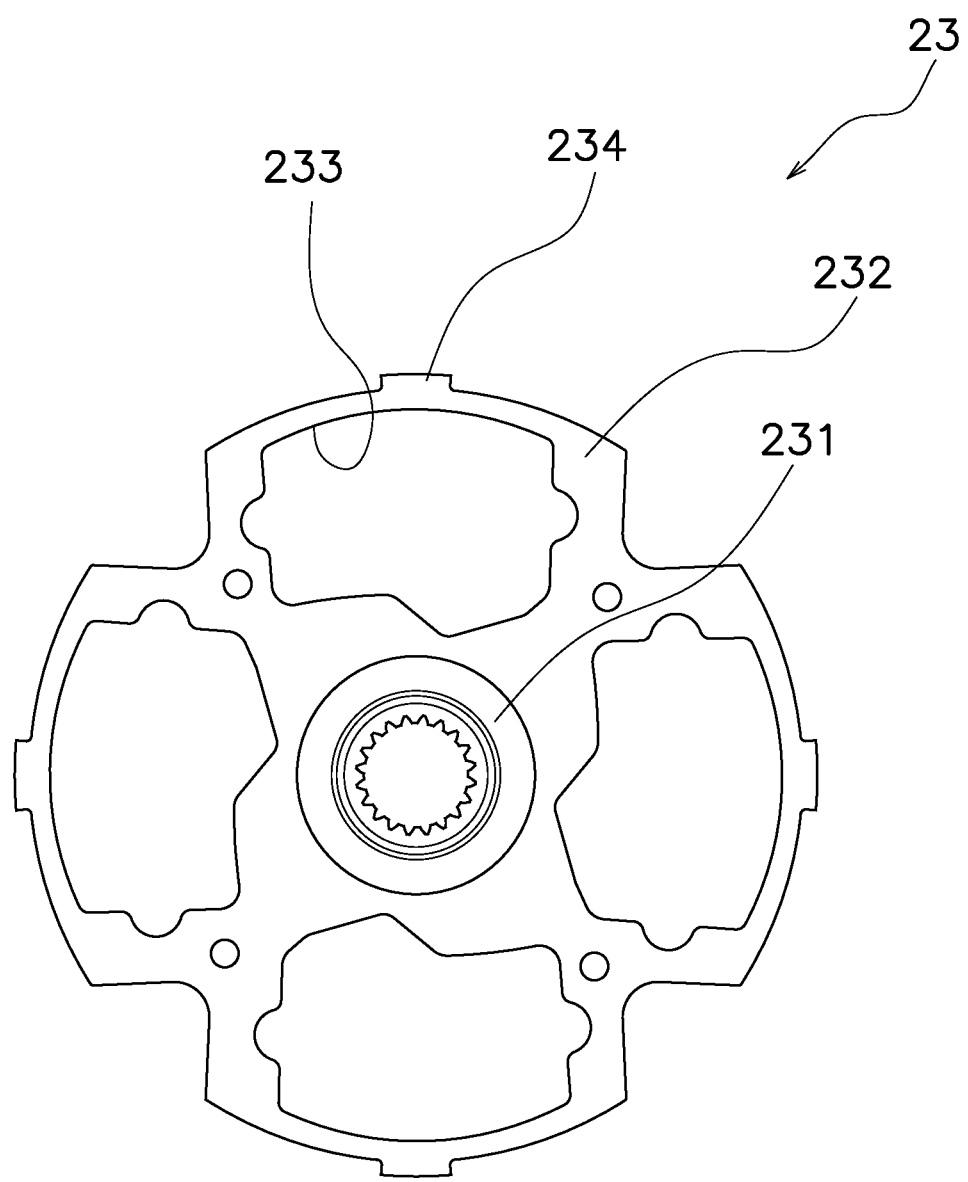
FIG. 4 is a front view of a hub flange.

As shown in FIGS. 2 and 4, the hub flange 23 is configured to transmit a torque, inputted thereto from the first and second input plates 21 and 22, to an output-side device. The hub flange 23 includes a hub portion 231, a flange portion 232 (exemplary output plate), and a plurality of accommodation holes 233. The hub portion 231 and the flange portion 232 are integrated as a single member but can be separated as different members.

The hub portion 231 has a tubular shape and is disposed within the center holes of the first and second input plates 21 and 22. The hub portion 231 is provided with a spline hole axially extending in the inner peripheral part thereof. The spline hole enables the input shaft 111, which is an output-side member, to be spline-coupled thereto.

The flange portion 232 radially extends from the outer peripheral surface of the hub portion 231. The flange portion 232 has an annular shape. The flange portion 232 is disposed axially between the first and second input plates 21 and 22. The flange portion 232 is disposed on the first side of the first side plate 51 in the axial direction.

The accommodation holes 233 are provided in the flange portion 232. It should be noted that in the present preferred embodiment, four accommodation holes 233 are provided in the flange portion 232. The accommodation holes 233 are aligned in the circumferential direction. Each accommodation hole 233 is disposed to overlap with each first window portion 211 and each second window portion 221 as seen in the axial direction.

The hub flange 23 includes a plurality of stopper portions 234. In the present preferred embodiment, the hub flange 23 includes four stopper portions 234. The stopper portions 234 protrude radially outward from the outer peripheral surface of the flange portion 232. The stopper portions 234 are contacted by the extending portions 223 of the second input plate 22, respectively, whereby both the first and second plates 21 and 22 are restricted from rotating relative to the hub flange 23.

<Elastic Members 24>

As shown in FIGS. 1 and 2, the elastic members 24 are configured to elastically couple the flange portion 232 and both the first and second input plates 21 and 22 in a rotational direction. The elastic members 24 are, for instance, coil springs.

The elastic members 24 are accommodated in the accommodation holes 233 of the flange portion 232, respectively. Besides, the elastic members 24 are accommodated in the first window portions 211 of the first input plate 21, respectively, while being accommodated in the second window portions 221 of the second input plate 22, respectively.

<Hysteresis Generating Mechanism 25>

The hysteresis generating mechanism 25 is configured to generate a hysteresis torque when relative rotation is caused between the hub flange 23 and both the first and second input plates 21 and 22.

[Actions]

A torque, transmitted from the engine to the flywheel 110, is inputted to the damper unit 2 through the torque limiter unit 5. In the damper unit 2, the torque is inputted to the first and second input plates 21 and 22 and is then transmitted to the hub flange 23 through the elastic members 24. Subsequently, a mechanical power is transmitted from the hub flange 23 through the input shaft 111 to the electric motor, the transmission, a power generator, and so forth that are disposed on the output side.

Incidentally, chances are that an excessive torque is transmitted from the output side to the engine in, for instance, engine start. In such a case, the magnitude of torque to be transmitted to the engine side is limited to a predetermined value or less by the torque limiter unit 5.

[Modifications]

The present invention is not limited to the preferred embodiment described above and a variety of changes or modifications can be made without departing from the scope of the present invention. Besides, modifications to be described are applicable simultaneously.

(a) In the preferred embodiment described above, the first input plate 21 includes the first attachment portions 213; however, the first input plate 21 may not include the first attachment portions 213. In this case, the fastening portions 26 fasten the second attachment portions 224 of the second input plate 22 and the first plate body 212 of the first input plate 21 to each other.

Figure 5:
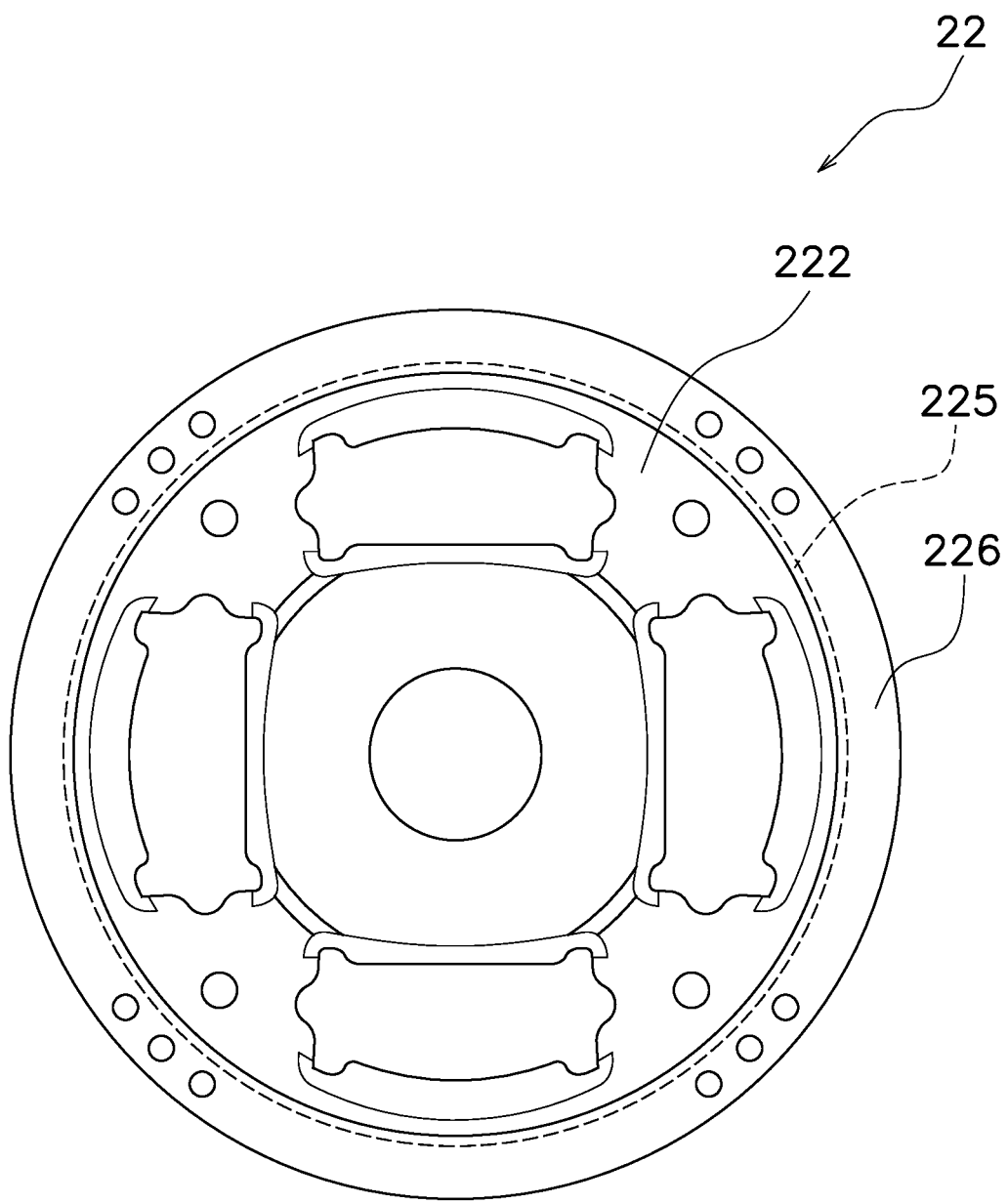
FIG. 5 is a front view of a second input plate according to a modification.

(b) In the preferred embodiment described above, the second input plate 22 includes the plural extending portions 223 and the plural second attachment portions 224; however, the second input plate 22 may not include the extending portions 223 and the second attachment portions 224. In this case, as shown in FIG. 5, the second input plate 22 can include a cylindrical portion 225 and a flange portion 226. The cylindrical portion 225 extends from the outer peripheral end of the second plate body 222 to the first side in the axial direction. Besides, the flange portion 226 extends radially outward from the axially first side-end of the cylindrical portion 225.

In the present modification, the outer peripheral end of the second input plate 22 is disposed on the first side of the inner peripheral end of the first side plate 51 in the axial direction. The outer peripheral end of the second input plate 22 overlaps with the inner peripheral end of the first side plate 51 as seen in the axial direction. It should be noted that the outer peripheral end of the second input plate 22 means the flange portion 226.

The outer diameter of the second input plate 22 is greater than the inner diameter of the first side plate 51. Besides, the outer diameter of the second input plate 22 is approximately equal to that of the first input plate 21. It should be noted that in the present modification, the outer diameter of the second input plate 22 means that of the flange portion 226.

(c) In the preferred embodiment described above, the friction plate 56 is provided as a member separated from the second input plate 22; however, the friction plate 56 can be integrated with the second input plate 22 as a single member.

REFERENCE SIGNS LIST

2: Damper unit
21: First input plate
212: First plate body
213: First attachment portion
22: Second input plate
222: Second plate body
223: Extending portion
224: Second attachment portion
23: Hub flange
24: Elastic member
26: Fastening portion
5: Torque limiter unit
51: First side plate
52: Second side plate
55a: First friction material
56: Friction plate
100: Damper device

What is claimed is:

1. A damper device configured to be attached to a power source-side member on a first side of the power source-side member in an axial direction, the damper device comprising:
   a damper unit; and
   a torque limiter unit configured to be attached to the power source-side member, wherein
   the damper unit includes
      a first input plate,
      a second input plate disposed on a second side of the first input plate in the axial direction, the second input plate configured to rotate unitarily with the first input plate,
      a fastening portion fastening the first and second input plates,
      an output plate, and
      an elastic member configured to elastically connect the output plate and the first and second input plates,
   the torque limiter unit includes
      a first side plate having an annular shape,
      a second side plate having an annular shape, the second side plate disposed on the second side of the first side plate in the axial direction, the second side plate disposed apart from the first side plate at an interval in the axial direction,
      a friction plate configured to rotate unitarily with the first and second input plates, and
      a first friction material disposed between the friction plate and the first side plate,
   the first input plate includes an outer peripheral end disposed on the first side of an inner peripheral end of the first side plate in the axial direction,
   the first input plate has an outer diameter greater than an inner diameter of the first side plate, and
   the fastening portion is disposed on the first side of the first side plate in the axial direction and to overlap with the first side plate as seen in the axial direction.

2. The damper device according to claim 1, wherein the output plate is disposed on the first side of the first side plate in the axial direction.

3. The damper device according to claim 1, wherein the friction plate is disposed on the second side of the second input plate in the axial direction.

4. The damper device according to claim 1, wherein
the first input plate includes a first plate body and a first attachment portion protruding radially outward from the first plate body, and
the fastening portion fastens the first attachment portion and the second input plate.

5. A damper device configured to be attached to a power source-side member on a first side of the power source-side member in an axial direction, the damper device comprising:
a damper unit; and
a torque limiter unit configured to be attached to the power source-side member, wherein
the damper unit includes
a first input plate including a first plate body and a first attachment portion protruding radially outward from the first plate body,
a second input plate disposed on a second side of the first input plate in the axial direction, the second input plate configured to rotate unitarily with the first input plate,
a fastening portion,
an output plate, and
an elastic member configured to elastically connect the output plate and the first and second input plates,
the torque limiter unit includes
a first side plate having an annular shape,
a second side plate having an annular shape, the second side plate disposed on the second side of the first side plate in the axial direction, the second side plate disposed apart from the first side plate at an interval in the axial direction,
a friction plate configured to rotate unitarily with the first and second input plates, and
a first friction material disposed between the friction plate and the first side plate,
the first input plate includes an outer peripheral end disposed on the first side of an inner peripheral end of the first side plate in the axial direction,
the first input plate has an outer diameter greater than an inner diameter of the first side plate, and
the fastening portion is disposed on the first side of the first side plate in the axial direction,
the second input plate including a second plate body, an extending portion, and a second attachment portion, the extending portion extending from the second plate body to the first side in the axial direction, the second attachment portion extending radially outward from the extending portion, and
the fastening portion fastens the first attachment portion and the second attachment portion.

6. The damper device according to claim 5, wherein the output plate is disposed on the first side of the first side plate in the axial direction.

7. The damper device according to claim 5, wherein the friction plate is disposed on the second side of the second input plate in the axial direction.

* * * * *